No. 761,112. PATENTED MAY 31, 1904.
A. B. TODD.
FOLDING BABY CARRIAGE.
APPLICATION FILED OCT. 9, 1903.
NO MODEL. 2 SHEETS—SHEET 1.

No. 761,112. PATENTED MAY 31, 1904.
A. B. TODD.
FOLDING BABY CARRIAGE.
APPLICATION FILED OCT. 9, 1903.
NO MODEL. 2 SHEETS—SHEET 2.
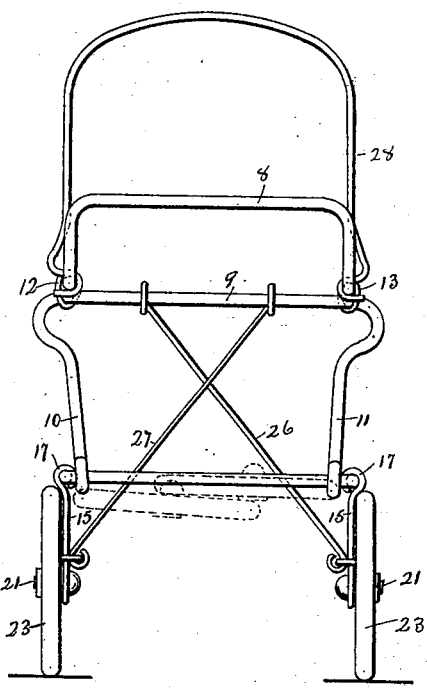
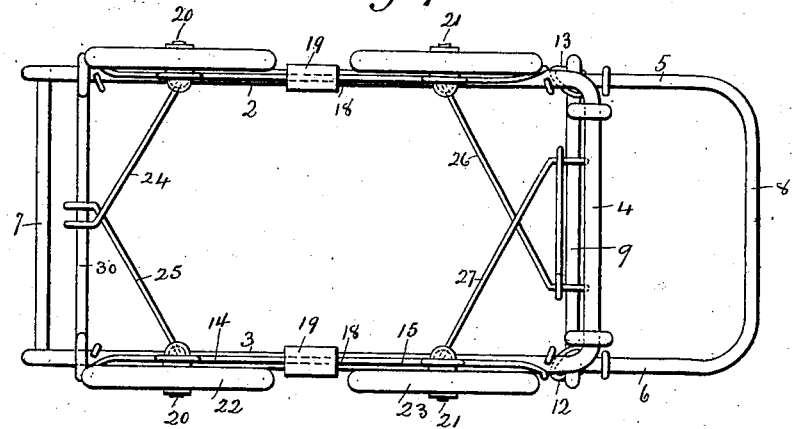

No. 761,112. Patented May 31, 1904.

UNITED STATES PATENT OFFICE.

ANDREW B. TODD, OF MERIDEN, CONNECTICUT.

FOLDING BABY-CARRIAGE.

SPECIFICATION forming part of Letters Patent No. 761,112, dated May 31, 1904.

Application filed October 9, 1903. Serial No. 176,367. (No model.)

*To all whom it may concern:*

Be it known that I, ANDREW B. TODD, of Meriden, in the county of New Haven and State of Connecticut, have invented a new and useful Improvement in Folding Baby-Carriages; and I do hereby declare the following, when taken in connection with the accompanying drawings and the letters of reference marked thereon, to be a full, clear, and exact description of the same, and which said drawings constitute part of this specification, and represent, in—

Figure 1:
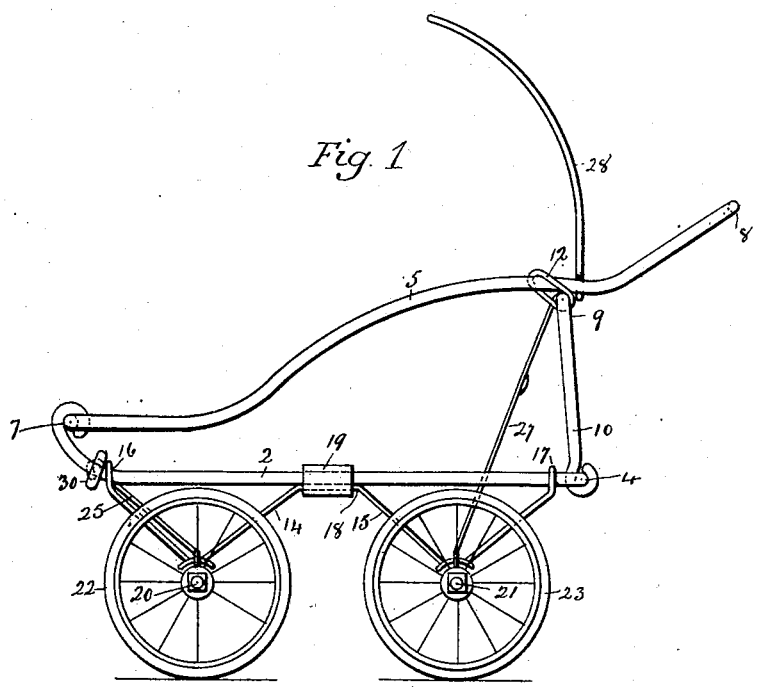
Figure 2:
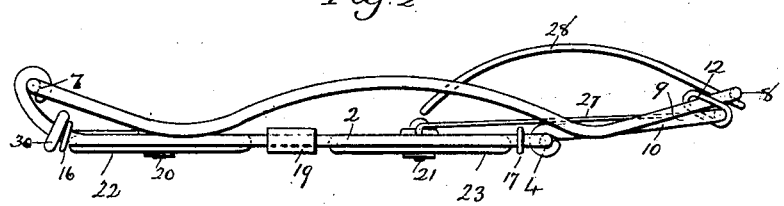

Figure 1, a side view of a skeleton frame for a folding carriage constructed in accordance with my invention; Fig. 2, a side view of the same with the parts in folded position; Fig. 3, a rear end view with the parts in open position; Fig. 4, an under side view of the same.

This invention relates to an improvement in folding baby-carriages, the object of the invention being a simple arrangement of parts whereby a four-wheeled vehicle is produced which may be readily folded so as to form a substantially flat package, not only as a convenient means for transporting a vehicle from the manufacturer to the user, but a convenient means for the user to take about from one place to another, as in traveling on street-cars; and the invention consists in the details of construction and combinations of parts, as will be hereinafter described, and particularly recited in the claims.

In carrying out my invention I employ a lower frame, consisting of lower side bars 2 3, a rear end 4, and an upper frame, consisting of upper sides 5 and 6, forward end 7, and rear or handle bar 8. The ends of the lower side bars 2 3 are turned around the forward bar 7, so as to be hinged thereto. The upper frame is covered with fabric of any suitable material for a support for the child. For convenience of illustrating the frame this covering is not shown. Between the upper and lower frame at the rear is a U-shaped brace 9, the ends 10 11 of which are turned around the lower rear bar 4, so as to be hinged thereto, and the upper bar of this brace is connected with the sides 5 6 of the upper frame by loops 12 and 13. To each of the side bars an axle-frame is attached. Each of these frames consist of two V-shaped portions 14 15, formed from wire, the ends 16 17 of which are turned around the respective side bars. A central portion 18 is also connected with the side bars by sleeves 19, which permit the axle-frames to turn. These axle-frames are adapted to support short axles 20 21, on which are mounted forward wheels 22 and rear wheels 23. The forward axles 20 are connected with a transverse rod 30 by braces 24 25, the ends of which cross each other and are adapted to slide on the said rod 30, the rod being connected with the sides of the lower frame at their forward ends. The rear axles 21 are connected in a like manner by links 26 27 with the top brace 9 except that the ends of the links are fixed against sliding movement on the brace. If desired, a shade or hood may be provided which may be attached to a bow 28, the ends of which are formed with hooks 29, adapted to engage with the sides 5 6 of the upper frame and so as to slide thereon. In its open position the brace stands in a substantially vertical position between the upper and lower frame and supports the upper frame in an inclined position. When in this position, the axle-frames are turned downward, so as to cause the wheels to support the frame.

To collapse the carriage, the brace 9 is drawn rearward, which draws the two frames together at the same time through the links 26 and 27. The axle-frames are turned inward, so as to draw the wheels into a plane parallel with the plane of the frames, the stays 24 and 25 sliding on the rod 7, so as to permit the forward wheels to turn inward at the same time the rear wheels are turned by the links 26 and 27. The rearward movement of the top bar of the brace on the sides 5 6 of the upper frame forces the lower end of the shade-bow 28 rearward, so as to turn the bow down upon the upper frame, as shown in Fig. 3. The carriage may then be conveniently transported.

When required for use, it is only necessary to separate the frames and force the brace 9 forward, which turns the axle-supports outward and at the same time holds the upper frame in its elevated position.

The frame, including the axle-supports, may be formed from wire or small tubing, or both, so that the vehicle is not only light and strong, but may be produced at a very low cost for manufacture.

Having fully described my invention, what I claim as new, and desire to secure by Letters Patent, is—

1. A folding carriage comprising an upper and lower frame, the frames hinged together at their forward ends, a brace pivotally connected with the rear bar of the lower frame and having sliding engagement with the side bars of the upper frame, axle-supports connected with the side bars of the lower frame, and links connecting the rear axles with the upper bar of said brace whereby the turning of the brace turns the axles substantially as described.

2. A folding carriage comprising two frames pivotally connected at their forward ends, a brace hinged to the lower frame and having sliding connection with the upper frame, axle-supports connected with the sides of the lower frame so as to turn thereon, axles and wheels carried by said axle-frames, cross-links connecting the rear axles with the top bar of said brace, and cross-links connecting the forward axles with the forward bar of the frame, substantially as described.

3. A folding carriage comprising an upper and lower frame formed from wire, the lower frame comprising sides and rear ends, the upper frame comprising sides, front and rear end, the ends of the sides connected with the forward end of the upper frame, a brace the ends of which are connected with the rear end of the lower frame and by links with the sides of the upper frame so as to slide thereon, axle-frames connected with the sides of the lower frame and so as to turn thereon, said axle-frames carrying axles and wheels mounted thereon, the inner ends of the rear axles connected with the upper bar of said brace by cross-links, a transverse rod connecting the sides of the lower frame near their forward ends, and cross-stays connecting the forward axles with said rod whereby as the brace is turned the axle-frames are folded forward beneath the frame substantially as described.

4. A folding carriage comprising an upper and lower frame, a brace connected with the rear bar of the lower frame and by links with the sides of the upper frame so as to slide thereon, axle-frames pivoted to the sides of the lower frame and carrying axles, connections between the rear axles and said brace, and a shade-support comprising a bow the ends of which are hook-shaped and adapted to engage with the sides of the upper frame, substantially as described.

In testimony whereof I have signed this specification in the presence of two subscribing witnesses.

ANDREW B. TODD.

Witnesses:
FREDERIC C. EARLE,
CLARA L. WEED.